US008893525B2

(12) United States Patent
Lee et al.

(10) Patent No.: US 8,893,525 B2
(45) Date of Patent: Nov. 25, 2014

(54) APPARATUS AND METHOD FOR MANUFACTURING TEMPERED GLASS

(75) Inventors: Hoikwan Lee, ChungCheongNam-Do (KR); Seo-Yeong Cho, ChungCheongNam-Do (KR); Yoon Young Kwon, ChungCheongNam-Do (KR); Kyungwook Park, ChungCheongNam-Do (KR); Kyungmin Yoon, ChungCheongNam-Do (KR); Jongsung Lee, ChungCheongNam-Do (KR); Jaeyoung Choi, ChungCheongNam-Do (KR); Gennady Kizevich, ChungCheongNam-Do (KR)

(73) Assignee: Samsung Corning Precision Materials Co., Ltd., Gyeongsangbuk-do (KR)

( * ) Notice: Subject to any disclaimer, the term of this patent is extended or adjusted under 35 U.S.C. 154(b) by 0 days.

(21) Appl. No.: 13/337,670

(22) Filed: Dec. 27, 2011

(65) Prior Publication Data
US 2012/0167630 A1 Jul. 5, 2012

(30) Foreign Application Priority Data
Dec. 30, 2010 (KR) .................. 10-2010-0139258

(51) Int. Cl.
| | | |
|---|---|---|
| *C03C 23/00* | (2006.01) | |
| *C03B 27/04* | (2006.01) | |
| *C03B 35/24* | (2006.01) | |
| *C03B 29/12* | (2006.01) | |
| *C03B 27/044* | (2006.01) | |
| *C03B 29/08* | (2006.01) | |

(52) U.S. Cl.
CPC ............. *C03B 29/08* (2013.01); *C03B 27/0413* (2013.01); *C03B 35/24* (2013.01); *C03B 29/12* (2013.01); *C03C 23/0005* (2013.01); *C03B 27/044* (2013.01)
USPC ................... 65/33.2; 65/95; 65/114; 65/33.1

(58) Field of Classification Search
CPC ...... C03C 21/00; C03C 23/00; C03C 23/001; C03C 23/0015; C03C 23/002; C03C 23/0025; C03C 23/0035; C03C 23/003; C03C 23/004; C03C 23/0045; C03C 23/005; C03C 23/0055; C03C 23/006; C03C 23/007; C03C 23/0065; C03C 23/0005; C03B 27/00; C03B 29/00; C03B 32/00; C03B 29/08; C03B 27/012; C03B 27/0417; G01N 23/00
USPC ..................................................... 65/90–101
See application file for complete search history.

(56) References Cited

U.S. PATENT DOCUMENTS

| | | | | |
|---|---|---|---|---|
| 3,875,766 A | * | 4/1975 | French .............................. | 65/97 |
| 5,093,177 A | * | 3/1992 | Anderson et al. ............... | 428/81 |

(Continued)

FOREIGN PATENT DOCUMENTS

FR 2507296 A1 12/1982

OTHER PUBLICATIONS

Allred, Clark L. Nuclear Radiation-Induced Dimensional Changes in Borosilicate Glass Substrates Used for MEMS Oscillators as provided by http://www.dtic.mil/cgi-bin/GetTRDoc?Location=U2&doc=GetTRDoc.pdf&AD=ADA393575 on Mar. 8, 2013.*
"Ionizing radiation", Wikipedia.
Thomas W. Dakin, R. W. Auxier: "Dielectric Heating", Industrial &Engineering Chemistry, vol. 37, No. 3, 1945, pp. 268-275.

(Continued)

*Primary Examiner* — Jodi C Franklin
(74) *Attorney, Agent, or Firm* — McDermott Will & Emery LLP

(57) ABSTRACT

An apparatus for manufacturing tempered glass. A transportation unit transports a glass substrate that is intended to be tempered. An ionizer ionizes alkali oxides in the glass substrate by radiating energy onto the glass substrate. A dielectric heating unit increases the temperature of the inner portion of the glass substrate in which the alkali oxides are ionized by the ionizer.

5 Claims, 3 Drawing Sheets

(56) References Cited

U.S. PATENT DOCUMENTS

| | | | |
|---|---|---|---|
| 5,827,345 A | 10/1998 | Boaz et al. | |
| 2003/0014997 A1* | 1/2003 | Dunifon | 65/25.1 |
| 2009/0126404 A1* | 5/2009 | Sakhrani et al. | 65/30.1 |
| 2009/0239733 A1* | 9/2009 | Kwon et al. | 501/53 |
| 2010/0126227 A1* | 5/2010 | Fekety et al. | 65/441 |
| 2010/0251775 A1* | 10/2010 | Regnier et al. | 65/400 |
| 2011/0259052 A1* | 10/2011 | Kuhn | 65/30.13 |
| 2012/0167626 A1* | 7/2012 | Lee et al. | 65/25.4 |
| 2012/0167630 A1* | 7/2012 | Lee et al. | 65/30.1 |
| 2013/0019639 A1* | 1/2013 | Saito et al. | 65/114 |
| 2013/0029473 A1* | 1/2013 | Kim et al. | 438/458 |
| 2013/0047673 A1* | 2/2013 | Lee et al. | 65/114 |

OTHER PUBLICATIONS

E.M. Yoshimura, E. Okuno, M. Suszynska: "Gamma irradiated soda lime silicate glasses of different origin: Isothermal light emission", Nuclear Instruments and Methods in Physics Research Section B: Beam Interactions With Materials and Atoms, vol. 191, No. 1-4, May 2002, pp. 375-378.

Paul W. Levy: "The Kinetics of Gamma-Ray Induced Coloring of Glass", Journal of the American Ceramic Society, vol. 43, No. 8, Aug. 1960, pp. 389-395.

D. L. Griscom, E. J. Friebele: "Effects of ionizing radiation on amorphous insulators", Radiation Effects, vol. 65, No. 1-4, 1982, pp. 63-72.

\* cited by examiner

APPARATUS AND METHOD FOR MANUFACTURING TEMPERED GLASS

CROSS REFERENCE TO RELATED APPLICATION

The present application claims priority from Korean Patent Application Number 10-2010-0139258 filed on Dec. 30, 2010, the entire contents of which application are incorporated herein for all purposes by this reference.

BACKGROUND OF THE INVENTION

1. Field of the Invention

The present invention relates to an apparatus and method for manufacturing tempered glass, and more particularly, to an apparatus and method for manufacturing tempered glass, in which the difference in temperature between the inside and outside of a glass substrate is maximized, so that tempering is more completely realized through quenching.

2. Description of Related Art

In general, tempered glass has resistance to pressure and changes in temperature superior to those of normal glass substrates, and, when broken, shatters into small fragments having the form of particles, thereby making it less likely to create a hazard due to shards. Therefore, tempered glass is widely used for solar cells, display devices, automobiles, buildings and the like.

A glass substrate is heated up to a temperature ranging from about 600° C. to about 900° C. in a heating chamber, and is then carried on a carriage into a cooling chamber, where air is ejected through air nozzles of an air cooling apparatus from above and below the heated glass substrate, so that the surface temperature of the heated glass rapidly drops to a temperature ranging from 200° C. to 400° C. Consequently, compressive strain is caused to remain in the surface layer of the heated glass, thereby manufacturing the tempered glass, the strength of which is increased so as to be superior to those of normal glass substrates.

However, the apparatus for manufacturing tempered glass of the related art is limited in its ability to increase the strength of the tempered glass, since it performs cooling using the air cooling apparatus, which takes in ambient air and then directly ejects it onto the glass. The strength of the tempered glass becomes higher when the glass is cooled more rapidly. In the related art, however, the heated glass is slowly cooled, since it is cooled using air that is at room temperature. Consequently, the tempering is incompletely carried out, thereby increasing the defective fraction of products. Moreover, this phenomenon becomes more serious in the summer when the temperature of the ambient air is higher.

The information disclosed in this Background of the Invention section is only for the enhancement of understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide an apparatus and method for manufacturing tempered glass, in which the difference in temperature between the inside and outside of a glass substrate is maximized, so that tempering is more completely realized through quenching.

Also provided are an apparatus and method for manufacturing tempered glass, in which the amount of time that is required to manufacture the tempered glass can be decreased, and productivity can be increased.

In an aspect of the present invention, the apparatus for manufacturing tempered glass includes a transportation unit, which transports a glass substrate that is intended to be tempered; an ionizer, which ionizes alkali oxides in the glass substrate by radiating energy onto the glass substrate; and a dielectric heating unit, which increases the temperature of the inner portion of the glass substrate in which the alkali oxides are ionized by the ionizer.

In an embodiment of the present invention, the transportation unit may include a substrate-floating section, which makes the glass substrate float using air.

According to embodiments of the invention, the apparatus for manufacturing tempered glass is implemented so as to include the ionizer, which ionizes alkali oxides in a glass substrate by radiating energy onto the glass substrate, and a dielectric heating unit, which increases the temperature of the inner portion of the glass substrate in which the alkali oxides are ionized by the ionizer. Accordingly, the apparatus can advantageously produce nonbridging oxygen and free electrons inside the glass substrate by radiating energy having a predetermined wavelength, such that the free electrons increase the high-frequency absorptivity inside the glass substrate, thereby maximizing the difference in temperature between the inner and outer portions of the glass substrate.

In addition, according to embodiments of the invention, the apparatus for manufacturing tempered glass is implemented so as to include the ionizer and the dielectric heating unit, and thus can advantageously decrease the amount of time that is required to increase the temperature of the glass by increasing the high-frequency absorptivity of the glass, thereby decreasing the amount of time to manufacture the tempered glass, and increasing productivity.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Reference will now be made in detail to various embodiments of the present invention, examples of which are illustrated in the accompanying drawings and described below. While the invention will be described in conjunction with exemplary embodiments thereof, it is to be understood that the present description is not intended to limit the invention to those exemplary embodiments. On the contrary, the invention is intended to cover not only the exemplary embodiments, but also various alternatives, modifications, equivalents and other embodiments that may be included within the spirit and scope of the invention as defined by the appended claims.

Figure 1:
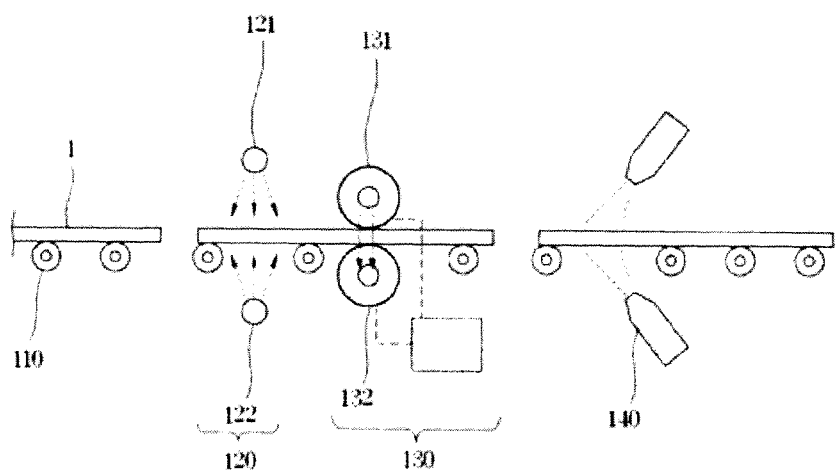
FIG. 1 is an example view explaining an apparatus for manufacturing tempered glass according to an exemplary embodiment of the present invention.

FIG. 1 is an example view explaining an apparatus for manufacturing tempered glass according to an exemplary embodiment of the present invention.

As shown in FIG. 1, the apparatus for manufacturing tempered glass 100 of this embodiment generally includes a transportation unit 110, an ionizer 120 (121, 122), a dielectric heater 130 (131, 132) and a cooling unit 140.

The transportation unit 110 transports the glass substrate 1 that is intended to be tempered. Although the transportation unit 110 is shown as including rollers in FIG. 1, this invention is not limited thereto. Alternatively, the apparatus for manufacturing tempered glass of the invention can be implemented in such a fashion that it can transport the glass substrate 1 by a noncontact technique.

Glass transportation units using rollers have encountered problems in that the surface of the glass substrate 1 is damaged in the process in which the surface of the glass substrate 1 is brought into contact with the surfaces of the rollers. As an example, when using the rollers to transport the glass substrate 1 in a high-temperature environment, such as in a heating chamber, the outer shape of the glass substrate 1 may be subjected to deformations, such as warping, sagging, scratches and wave-like grooves (called, "roller waves").

The transportation unit 110 may be implemented so as to include a substrate-floating section which makes the glass substrate 1 float using air. The substrate-floating section may be implemented so as to include an air supply which supplies air to the glass substrate.

The ionizer 120 serves to ionize alkali oxides of the glass substrate 1 by radiating energy onto the glass substrate 1, which is being transported by the transportation unit 110. The ionizer 120 produces nonbridging oxygen and free electrons inside the glass substrate 1 by emitting electromagnetic waves, such as UV radiation, X-rays, or γ-rays, thereby increasing the conductivity of the glass substrate 1. When the ionizer 120 performs ionizing the alkali oxides of the glass substrate 1, it functions to increase the high-frequency absorptivity of the glass substrate 1.

The dielectric heating unit 130 has high-frequency electrodes 131 and 132. The dielectric heating unit may dielectrically heat the glass substrate using microwaves, radio waves, or the like.

The dielectric heating unit 130 can increase the temperature of the inside of the glass substrate 1 more than the temperature of the outer surface of the glass substrate 1, in which the alkali oxides are ionized by the ionizer 120. Prior to the dielectric heating, the step of heating the glass substrate using a common method can be provided. Alternatively, the ionization of the glass substrate may be performed at the final point of time in a typical heating step.

The cooling unit 140 quenches (500~800 w/m2K) the glass substrate 1, which has passed sequentially through the ionizer 120 and the dielectric heating unit 130. As an example, the cooling unit 140 may be implemented so as to include an air compressor, which supplies cooled and compressed air, an air supply pipe, which guides the compressed air that is supplied from the air compressor to an ejector nozzle, a water mist producing section, which produces water mist, and a water mist supply pipe, which guides the water mist that is produced by the water mist producing section to the ejector nozzle. Here, the water mist producing section produces the water mist by removing water from a water tank by vibrating it using supersonic waves having a frequency of about 1.69 MHz.

Figure 2:
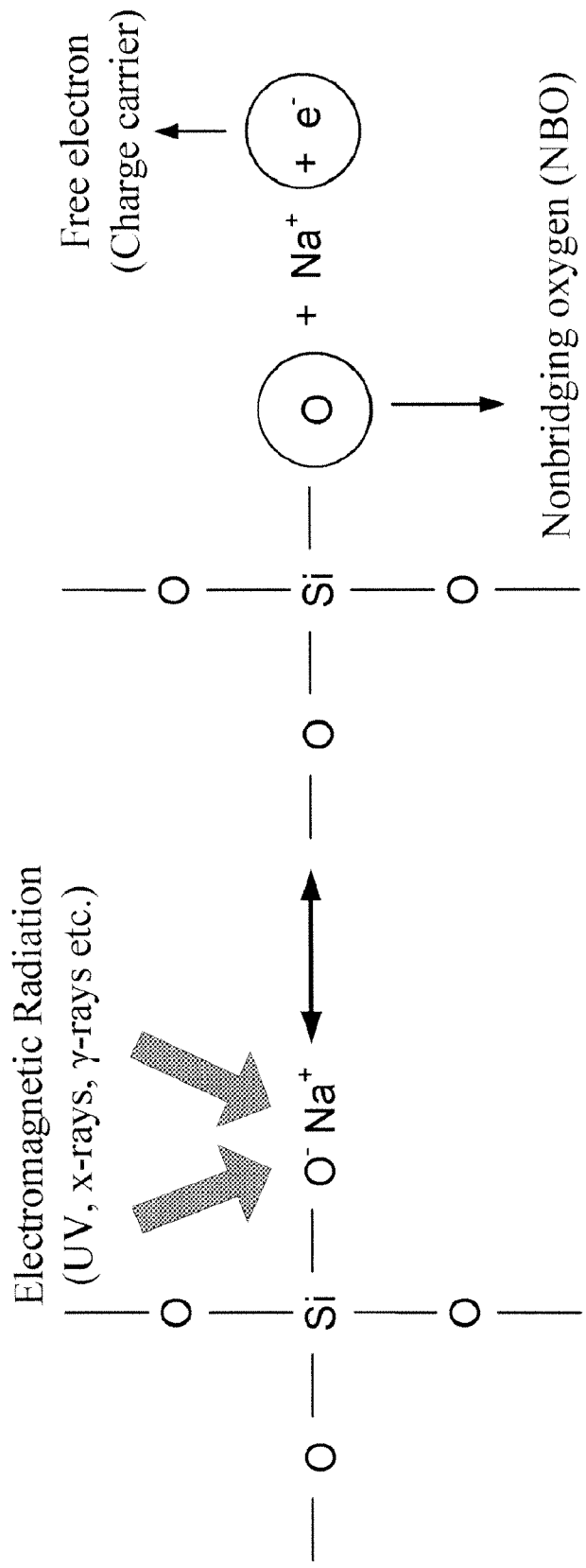
FIG. 2 is an example view explaining a mechanism in which an apparatus for manufacturing tempered glass according to an exemplary embodiment of the present invention produces nonbridging oxygen and free electrons inside a glass substrate by radiating energy having a predetermined wavelength.

FIG. 2 is an example view explaining the mechanism by which an apparatus for manufacturing tempered glass according to an exemplary embodiment of the present invention produces nonbridging oxygen and free electrons inside a glass substrate by radiating energy having a predetermined wavelength.

Normally, in order to apply the high-frequency dielectric heating to the tempering of a glass substrate, a temperature atmosphere in which the high-frequency absorptivity of the glass substrate can be activated must be formed and maintain. An atmospheric temperature ranging from about 350° C. to about 500° C. is required. Regarding the dielectric constant of an insulator, dielectric loss generally increases (resistance decreases) at high temperatures, and the temperature increases from the inside when high-frequency waves are applied. In order to provide a temperature atmosphere in which high-frequency absorptivity is activated as described above, the additional supply of heat and time are required.

However, the apparatus for manufacturing tempered glass of the present invention is implemented such that it causes a dielectric loss in a glass substrate using the ionizer prior to high-frequency dielectric heating, so that high-frequency dielectric heating can be effectively performed.

As shown in FIG. 2, the ionizer produces nonbridging oxygen (NBO) and free electrons $e^-$ in alkali oxides inside the glass substrate by emitting electromagnetic waves, such as UV radiation, X-rays, or γ-rays, for a short time. Here, the free electrons $e^-$ act as charge carriers, thereby increasing the conductivity of the glass substrate. When high-frequency dielectric heating is performed on the glass substrate in which the charge carriers are increased, the effect of the dielectric heating is increased because the high-frequency absorptivity of the glass substrate 1 is increased. Since the temperature of the inside of the ionized glass substrate is increased compared to that of a glass substrate that is not ionized, the difference in temperature $\Delta T$ between the inside and the surface of the glass substrate is increased at the time of cooling. Accordingly, the efficiency of dielectric heating can be sufficiently improved even though the atmospheric temperature (from about 350° C. to about 500° C.) is not formed or maintained.

Figure 3:
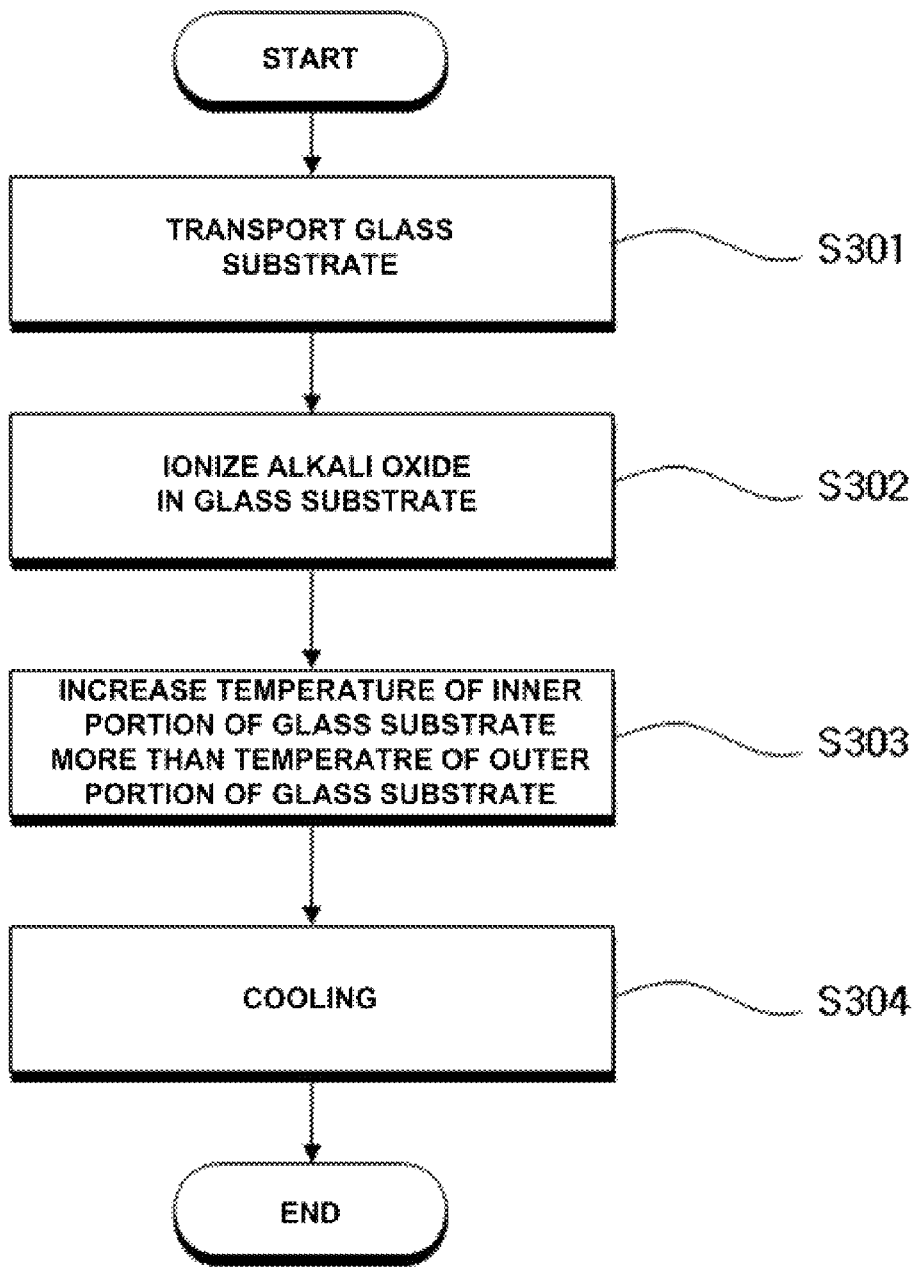
FIG. 3 is a flowchart illustrating a method for manufacturing tempered glass according to an exemplary embodiment of the present invention.

FIG. 3 is a flowchart illustrating a method for manufacturing tempered glass according to an exemplary embodiment of the present invention.

As shown in FIG. 3, in the method for manufacturing tempered glass of this embodiment, first, a loaded glass substrate is transported at S301. The glass substrate may be transported by a contact technique, which uses, for example, transportation rollers or a conveyor belt, or by a noncontact technique, which transports the glass substrate up in the air.

Afterwards, at S302, energy is radiated onto the transported glass substrate, thereby ionizing alkali oxides in the glass substrate. In an example, the alkali oxides in the glass substrate can be ionized by radiating energy onto the glass substrate using one of UV radiation, X-rays and γ-rays.

Afterwards, at S303, high-frequency dielectric heating is performed to increase the temperature of the inside of the glass substrate in which the alkali oxides are ionized. Then, at S304, the glass substrate is quenched.

The foregoing descriptions of specific exemplary embodiments of the present invention have been presented for the purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for manufacturing tempered glass, comprising:
    transporting a glass substrate through a tempering apparatus, and while being transported through the tempering apparatus:
    ionizing the glass substrate;
    dielectrically heating the glass substrate following ionizing; and
    cooling the glass substrate following heating,
    wherein the ionizing the glass substrate comprises ionizing alkali oxides in the glass substrate to produce non-bridging oxygen and free electrons such that the free electrons increase the high-frequency absorptivity inside the glass substrate, thereby maximizing the difference in temperature between the inner and outer portions of the glass substrate.

2. The method of claim 1, wherein the ionizing the glass substrate comprises radiating ionizing radiation onto the glass substrate.

3. The method of claim 2, wherein the ionizing radiation comprises at least one selected from the group consisting of UV radiation, X-rays and γ-rays.

4. The method of claim 1, wherein the dielectrically heating the glass substrate comprises dielectrically heating the glass substrate at a high frequency so that a temperature of an inner portion of the glass substrate is increased more than a temperature of a surface of the glass substrate,
    wherein the high frequency is microwave or radio waves.

5. The method of claim 1, comprising transporting the glass substrate so that the glass substrate is floating on air during at least one of the ionizing the glass substrate, the dielectrically heating the glass substrate, and the cooling the glass substrate.

* * * * *